(12) United States Patent
Yoshida et al.

(10) Patent No.: US 7,610,262 B2
(45) Date of Patent: Oct. 27, 2009

(54) FILE MANAGEMENT DEVICE

(75) Inventors: Haruo Yoshida, Kanagawa (JP);
Shigeru Kashiwagi, Tokyo (JP);
Masaharu Murakami, Tokyo (JP);
Hiroshi Jinno, Kanagawa (JP);
Masayoshi Ohno, Tokyo (JP)

(73) Assignee: Sony Corporation (JP)

( * ) Notice: Subject to any disclaimer, the term of this patent is extended or adjusted under 35 U.S.C. 154(b) by 47 days.

(21) Appl. No.: 10/572,808

(22) PCT Filed: Sep. 7, 2004

(86) PCT No.: PCT/JP2004/013288

§ 371 (c)(1),
(2), (4) Date: Mar. 22, 2006

(87) PCT Pub. No.: WO2005/036420

PCT Pub. Date: Apr. 21, 2005

(65) Prior Publication Data

US 2007/0050414 A1    Mar. 1, 2007

(30) Foreign Application Priority Data

Oct. 10, 2003   (JP) ............................. 2003-351881

(51) Int. Cl.
*G06F 7/00* (2006.01)
(52) U.S. Cl. .......................................................... 707/2
(58) Field of Classification Search ...................... 707/2
See application file for complete search history.

(56) References Cited

U.S. PATENT DOCUMENTS

| 2002/0194483 | A1* | 12/2002 | Wenocur et al. | ............ 713/185 |
| 2003/0041304 | A1* | 2/2003 | Numata et al. | .............. 715/513 |
| 2003/0088576 | A1* | 5/2003 | Hattori et al. | ........... 707/103 R |
| 2003/0135495 | A1* | 7/2003 | Vagnozzi | ....................... 707/3 |
| 2003/0135735 | A1* | 7/2003 | Marejka et al. | ............. 713/171 |

FOREIGN PATENT DOCUMENTS

| JP | 04-086950 | 3/1992 |
| JP | 06-243170 | 9/1994 |
| JP | 2001-084705 | 3/2001 |
| JP | 2002-247488 | 8/2002 |
| JP | 2002-278996 | 9/2002 |

OTHER PUBLICATIONS

International Search Report mailed Oct. 12, 2004.
International Written Opinion mailed Oct. 12, 2004.
English Translation of the International preliminary report of patentability of international application No. PCT/JP2004/013288 from the International Bureau.

* cited by examiner

*Primary Examiner*—Charles Rones
*Assistant Examiner*—Fazlul Quader
(74) *Attorney, Agent, or Firm*—Rader Fishman & Grauer PLLC; Ronald P. Kananen

(57) ABSTRACT

The present invention relates to a file management technique using indexes, wherein retrieval results and conditions for retrieval are recorded and stored on an entry for a virtual folder on the index for efficient later use. By this feature, objects for retrieval can be refined by using the recorded retrieval results, so that the processing for retrieval can substantially be simplified.

7 Claims, 6 Drawing Sheets

US 7,610,262 B2

FILE MANAGEMENT DEVICE

TECHNICAL FIELD

The present invention relates to a file management device, a file managing method, a program for the file managing method, and a recording medium recorded with a program for the file managing method, which can be applied to, for instance, an optical disk apparatus. The present invention allows for the effective use of a result searched in the past by storing the searched result as recorded in an entry related to a virtual folder at a later date.

BACKGROUND ART

There have been suggested a disk apparatus and others for recording a result of imaging using a high-capacity recording medium capable of random access, such as an optical disk.

With relation to such a disk apparatus, for instance, Japanese Patent Laid-open No. 2001-84705 suggests a method of improving the operation of a large number of files by using an index file that is created from the large number of files recorded in a recording medium and recorded in the recording medium.

Japanese Patent Publication No. 2002-278996 suggests another method of further improving the operation of the large number of files by managing each file layered in the index file created as described above.

Namely, in these methods, the index file is formed by grouping extracted information containing information concerning the managed files extracted with respect to each attribute, and each group is formed with a sequence of entries based on the extracted information from each file. More specifically, these index files are configured with a text entry assigned with the extracted information by a letter string concerning a disk title and each managed file, a thumbnail image entry assigned with the extracted information by a still image (thumbnail image) showing the content of the disk title and each managed file, and a property entry assigned with data indicating the attribute of the disk title and each managed file.

This enables the index file, for instance, to provide a user with a thumbnail image of each file from the thumbnail image entry and to provide the user with a title of each file from the text entry so as to select a desired file easily and reliably.

Since the property entry has various information concerning corresponding files therein, it is assumed to be possible, in such an index file, to refine a file recorded in the recording medium by searching based on the creation date of the file using the records in the property entry to search the desired file quickly. Since the text entry has the title recorded therein, it is also assumed to be possible to search the desired file quickly by searching each of the text entries by keyword searches. It is also supposed to be possible to refine the files and search the desired file easily and reliably by searching the thumbnail image entry depending on whether there is a thumbnail image or not.

However, in searching a file recorded in such a recording medium, when a large number of files are recorded in the recording medium, it is possible that the same searches are often repeated. It is also possible that a search processing is executed to further refine the result of a search executed in the past. It is supposed to be useful to make effective use of the result of the search result in the past at a later date.

DISCLOSURE OF INVENTION

The present invention was made in consideration of the issues described above to suggest a file management device, a file managing method, a computer program for the file managing method, and a recording medium recorded with the same, allowing for making effective use of the result of the search result in the past at a later date.

In order to solve the problems, the present invention is applied to the file management device managing files recorded in a recording medium by an index file recorded in the recording medium, wherein the index file has a series of entries including, in block, information extracted from a file recorded in the recording medium, information extracted from a file correlated to a folder set in the recording medium, and information extracted from the folder, and indicates layer structures of the file and the folder by layer information pointing other entries set in the entry; wherein an entry of the folder indicates the files belonging to the folder by registration information pointing to other entries, and indicates, by the identifying information, whether or not the corresponding folder is a virtual folder; and wherein the file management device retrieves an entry of the index file according to conditions for retrieval set by a user to select a file registered in the index file, and sets the registration information in an entry of the virtual folder so that an entry corresponding to the selected file is indicated.

When the configuration of the present invention is applied to the file management device managing files recorded in a recording medium by the index file recorded in the recording medium, wherein the index file has a series of entries including, in block, information extracted from a file recorded in the recording medium, information extracted from a file correlated to a folder set in the recording medium, and information extracted from the folder, and the index file indicates layer structures of the file and the folder by layer information pointing other entries set in the entry; wherein an entry of the folder indicates the files belonging to the folder by registration information pointing to other entries, and the entry of the folder indicates, by the identifying information, whether or not the corresponding folder is a virtual folder; and wherein the file management device retrieves an entry of the index file according to conditions for retrieval set by a user to select a file registered in the index file, and sets the registration information in an entry of the virtual folder so that an entry corresponding to the selected file is indicated, the search result can be recorded and stored in the entry corresponding to the virtual folder set for the index file, whereby the search result in the past can be effectively used by processing on the index file at a later date.

The present invention is also applied to the file management method managing files recorded in a recording medium by an index file recorded in the recording medium; wherein the index file has a series of entries including, in block, information extracted from a file recorded in the recording medium, information extracted from a file correlated to a folder set in the recording medium, and information extracted from the folder, and indicates layer structures of the file and the folder by layer information pointing to other entries set in the entry; and wherein an entry of the folder indicates the files belonging to the folder by registration information pointing to other entries, and indicates, by the identifying information, whether or not the corresponding folder is a virtual folder. The method includes a step of retrieving entries of the index file according to retrieval conditions set by a user to select a file registered in the index file and a step of registering registration information pointing to an entry corresponding to the file selected in the retrieving step and the retrieval conditions in an entry of the virtual folder.

With the above configuration, the present invention thus provides the file managing method allowing for an effective use of a search result in the past at a later date by the processing on the index file.

The present invention is also applied to a computer program of the file managing method for managing the files recorded in the recording medium based on an index file recorded in the recording medium by having a computer execute the prespecified processing sequence, wherein the index file has a series of entries including, in block, information extracted from a file recorded in the recording medium, information extracted from a file correlated to a folder set in the recording medium, and information extracted from the folder, and indicates layer structures of the file and the folder by layer information pointing to other entries set in the entry; and wherein an entry of the folder indicates the tiles belonging to the folder by registration information pointing to other entries, and indicates, by the identifying information, whether or not the corresponding folder is a virtual folder. The processing sequence includes a step of retrieving entries of the index file according to retrieval conditions set by a user to select a file registered in the index file and a step of registering registration information pointing to an entry corresponding to the file selected in the retrieving step and the retrieval conditions in an entry of the virtual folder.

With the above configuration, the present invention thus provides the file managing method program allowing for the effective use of a search result in the past at a later date by the processing on the index file.

The present invention is also applied to a recording medium recorded with the computer program of the file managing method for managing the files recorded in the recording medium based on the index file recorded in the recording medium by having a computer execute the prespecified processings, wherein the index file includes a series of entries comprising, in block, information extracted from a file recorded in the recording medium, information extracted from a file correlated to a folder set in the recording medium, and information extracted from the folder, and indicates layer structures of the file and the folder by layer information pointing to other entries set in the entry; wherein an entry of the folder indicates the files belonging to the folder by registration information pointing other entries, and indicates, by the identifying information, whether or not the corresponding folder is a virtual folder is indicated. The prespecified processing sequence includes a step of retrieving entries of the index file according to retrieval conditions set by a user to select a file registered in the index file and a step of registering registration information pointing to an entry corresponding to the file selected in the retrieving step and the retrieval conditions in an entry of the virtual folder.

With the above configuration, the present invention thus provides the recording medium recorded with the program of the file managing method allowing for an effective use of a search result in the past at a later date by the processing on the index file.

With the present invention, the processing on the index file makes an effective use of the search result in the past at a later date.

BEST MODE FOR CARRYING OUT THE INVENTION

An embodiment of the present invention is described below with reference to the drawings as needed.

Figure 1:
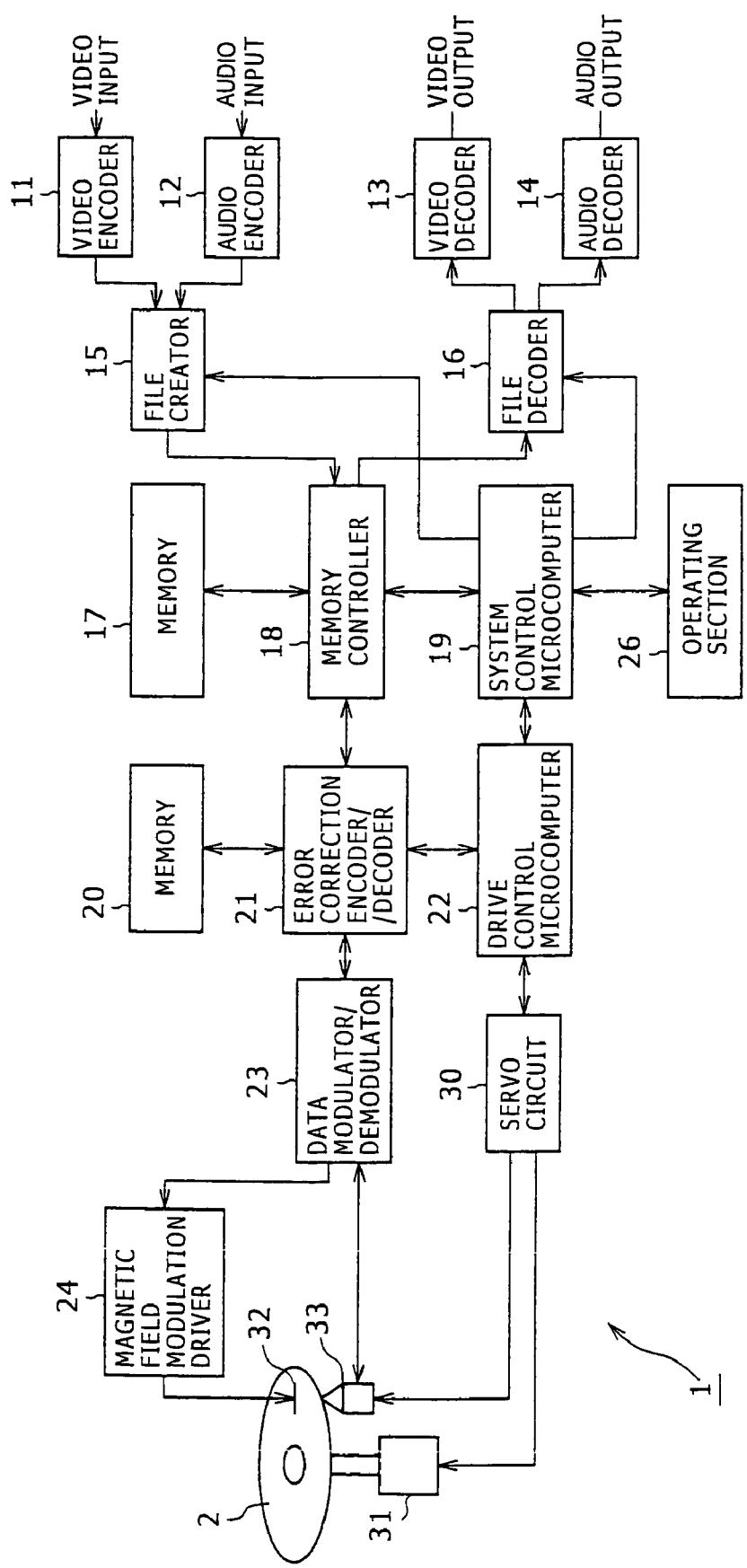
FIG. 1 is a block diagram showing an optical disk apparatus according to an embodiment of the present invention.

(1) Configuration of the Embodiment (1-1) Configuration of the Optical Disk Apparatus FIG. 1 is a block diagram showing an optical disk apparatus according to the embodiment of the present invention. The optical disk apparatus 1 acquires an image signal and an audio signal of an object using an imaging means and a sound-acquiring means (not shown) and records the result of imaging by the image signal and sound signal on an optical disk 2. The optical disk apparatus 1 also reproduces the result of imaging recorded in the optical disk 2 and outputs the result to a display unit including a liquid crystal display panel and a sound output unit including a speaker or to an external device. The optical disk apparatus 1 acquires such a result of imaging in the form of a moving image or a still image under the control of a system controlling microcomputer 19 operated by a user, and compresses the moving image by MPEG (Moving Picture Experts Group) format to record the same on the optical disk 2 in a prespecified file format, or compresses the still image by JPEG (Joint Photographic Coding Experts Group) format to record the same on the optical disk 2 in a prespecified file format. This embodiment uses Quick Time (hereinafter referred to as "QT") as the file format.

With this configuration in the optical disk apparatus 1, a video encoder 11 executes analog-to-digital conversion to the image signal from the imaging result to produce an image data, encodes the image data based on either MPEG or JPEG format, and thereby outputs the coded data from the image data.

An audio encoder 12 executes analog-to-digital conversion to the audio signal in the imaging result to produce an audio data, encodes the audio data, and outputs the coded data from the audio data thereby.

At the time of recording, file creator 15 multiplies the coded data outputted from the video encoder 11 and the audio encoder 12 to produce a data sequence of the QT movie file under the control of the system controlling microcomputer 19.

A memory controller 18 switches operations under the control of the system controlling microcomputer 19, records the data sequence of the QT movie file outputted from the file creator 15 and various data outputted from the system controlling microcomputer 19 in a memory 17 in the order of precedence for a temporary retention at the time of recording, and outputs the retained data corresponding to a sequential processing by an error-correction encoder/decoder 21. At the time of reproducing, the memory controller 18 in turn temporarily retains the output data from the error-correction encoder/decoder 21 and outputs the same to a file decoder 16 and the system controlling microcomputer 19.

The error-correction encoder/decoder 21 switches operations under the control of the system controlling microcomputer 19 and temporarily records the output data from the memory controller 18 in a memory 20 to add an error-correction code. By reading out the data recorded in the memory 20 and outputting the data in a prespecified order, the error-correction encoder/decoder 21 also interleaves these data to output to a data modulator/demodulator 23. At the time of reproducing, on the contrary to the time of recording, the error-correction encoder/decoder 21 also deinterleaves the data outputted from the data modulator/demodulator 23 by temporarily recording the data outputted from the data modulator/demodulator 23 in the memory 20 and outputs the data to the memory controller 18 in a prespecified order. At the same time, errors are corrected by the error correction codes added at the time of recording.

The data modulator/demodulator 23 switches operations under the control of the system controlling microcomputer 19, and at the time of recording, after converting the output data from the error-correction encoder/decoder 21 into a serial data sequence, executes a modulation processing to output the same to either a magnetic field modulation driver 24 or an optical pick-up 33. At the time of reproducing, the data modulator/demodulator 23 reproduces the clock from the reproduction signal outputted from the optical pick-up 33, obtains a reproduction data corresponding to the serial data sequence produced at the time of recording by binary-identifying and demodulating the reproduction signal based on the clock, and outputs the reproduction data to the error-correction encoder/decoder 21.

The magnetic field modulation driver 24 drives a magnetic field head 32 by the output signal from the data modulator/demodulator 23 under the control of the system controlling microcomputer 19 at the time of recording when the optical disk 2 is a magnetic optical disk. The magnetic field head 32 is held on the opposite side of the optical disk 2 from the optical pick-up 33 and impresses a modulation magnetic field at the position of the laser beam emitted by the optical pick-up 33 according to the output data from the data modulator/demodulator 23. In this way, when the optical disk 2 is a magneto-optical disk, the optical disk apparatus 1 records a QT movie file and the like in the optical disk 2 by the thermomagnetic recording method.

The optical disk 2 is a disk-like recording medium, and it is a rewritable optical disk, such as a magneto-optical disk (MO), or a phase-changing type of disk in this embodiment. A spindle motor 31 rotates the optical disk 2 according to conditions including a constant linear velocity (CLV), a constant angular velocity (CAV), a zone constant linear velocity (ZCLV) and the like suited to the optical disk 2.

The servo circuit 30 controls operations of the spindle motor 31 based on various types of signals outputted from the optical pick-up 33, and thereby provides spindle control. The servo circuit 30 also provides tracking control and focus control for the optical pick-up 33, drives the optical pick-up 33 and magnetic head 32 for seeking, and furthermore executes the processing such as focus search.

A drive control microcomputer 22 controls operations in the servo circuit 30 such as seeking according to an instruction from the system control microcomputer 19.

The optical pick-up 33 irradiates a laser beam to the optical disk 2, receives the reflected light with a prespecified photo acceptance unit, computes a result of photo-acceptance to produce and output various control signals, and also outputs a reproduction signal with a signal level varying according to a pit array or a mark array formed in the optical disk 2. Furthermore, the optical pick-up 33 switches an operation according to control by the system control microcomputer 19 and intermittently heightens the intensity of laser beam irradiated to the optical disk 2 in recording when the optical disk 2 is an magneto-optical disk. With this functional configuration, in this optical disk device 1, a QT movie file or the like is recorded in the optical disk based on the so-called pulse train system. When the optical disk 2 is a phase-change type of disk, the optical pick-up 33 heightens the intensity of laser beam irradiated to the optical disk 2 from that in reproduction to that in writing according to output data from a data demodulator 23, and records a QT movie file or the like in the optical disk 2 using the technique of thermal recording.

Because of the functional configuration as described above, in the optical disk device 1, video signals and audio signals as a result of imaging are respectively compressed by the video encoder 11 and the audio encoder 12 to be converted into elementary streams. Next, the elementary streams are converted into a QT movie file by the file creator 15, and then the file is passed through the memory controller 18, the error-correction encoder/decoder 21, and the data demodulator 23, and thus the data of the QT movie file, data on the index file and the like are recorded in the optical disk 2 by the optical pick-up 33 or by the optical pick-up 33 and the magnetic head 32. The index file is a file for indexing with the QT movie file recorded in the optical disk 2 set in an management object file, and the details are described below.

In the optical disk device 1, reproduction signals acquired by the optical pick-up 33 are processed by the data modulator/demodulator 23 to obtain data for reproduction, and the data for reproduction is processed by the error-correction encoder/decoder 21 to reproduce the QT movie file, the index file, and the like recorded in the optical disk 2, and the QT movie file, the index file, and the like are outputted from the memory controller 18.

The file decoder 16 receives data in the QT movie file outputted from the memory controller 18 and separates the data into encoded video data and encoded audio data to output the data to a video decoder 13 and a audio decoder 14, respectively. The video decoder 13 subjects the encoded video data to data decompression and outputs the decompressed data to a display means or another not shown external device. The audio decoder 14 subjects the encoded audio data outputted from a file decoder 16 to data decompression and outputs the decompressed data to an audio output means or another not shown external device. With the operations described above, the optical disk device 1 outputs the data so that a result of imaging reproduced from the optical disk 2 can be monitored.

The optical disk device 1 has an interface for connection with an external device, such as a computer, and can record a result of imaging as output data from the computer in the optical disk 2, or reproduce a file recorded in the optical disk 2, and processes the reproduced data with the computer.

An operating section 26 includes various operators for the optical disk device 1 and a touch panel provided on a liquid crystal display panel, and it notifies various operations performed by a user to the system control microcomputer 19.

The system control microcomputer 19 is used for controlling operations of the optical disk device 1 as a whole, and it makes the optical pick-up 33 seek along the innermost periphery of the optical device 2, when loading of the optical disk 2 is detected by executing a prespecified processing program recorded in a not shown memory to reproduce management information for a file management system for the optical disk 2. Further the system control microcomputer 19 acquires the reproduced management information from the memory controller 18, and stores the information in a memory incorporated therein. With the functional configuration as described above, the address of each file recorded in the optical disk 2 and an empty area are detected.

The processing program for the system control microcomputer 19 is installed generally before shipment, but it may be downloaded via a network for installation or may be reproduced from a recording medium for installation. Various types of recording media including an optical disk, a magnetic tape, and a memory card may be used for the purpose as described above.

The system control microcomputer 19 checks the management information acquired as described above, and when an index file is recorded in the optical disk 2, the system control microcomputer 19 makes the optical pick-up 33 seek to a position at which the index file is recorded and reproduces the index file. Furthermore, the system control microcomputer 19 acquires the reproduced index file with the memory controller 18 and records and stores the reproduced index file in a memory incorporated therein. Because of the functional configuration as described above, in this embodiment, the general operability in processing files recorded in the optical disk 2 is improved by making use of the index file.

Namely, in response to user's operations, the system control microcomputer 19 controls operations of the optical disk device 1 to introduce contents of a QT movie file recorded in the optical disk 2 by displaying thumbnail images and the like stored in the index file on a liquid crystal panel for monitoring, to accept selection of a file by a user based on the introduction above, and to reproduce the file selected by the user based on the corresponding management file.

When recording of a result of imaging is instructed by a user, the system control microcomputer 19 detects an empty area based on the management information and makes the optical pick-up 33 seek to the empty area, and records the results of imaging acquired successively in the optical disk 2. Furthermore, the system control microcomputer 19 updates the management information stored in a memory to correspond to a record of a QT movie file recorded as a result of imaging, and also updates management information in the optical disk 2 based on the updated management information, for instance, when the optical disk 2 is unloaded. The management information is updated by outputting the management information stored in a memory and updated as described above to the error-correction encoder/decoder 21 via the memory controller 18.

In the processing steps, the system control microcomputer 19 outputs various types of information required for production of the QT movie file to be recorded to the file creator 15. Furthermore, the system control microcomputer 19 acquires information required for creation of an index file via the file creator 15, and updates the index file for the QT movie file to be recorded in the optical disk 2 anew based on the information acquired as described above as well as the information outputted to the file creator 15, and the like, and also updates the index file recorded in the optical disk 2 based on the index file updated as described above and stored in the memory as in updating the management information.

When edition of a file recorded in the optical disk 2 is instructed by a user, the system control microcomputer 19 updates, in response to the instruction for updating, the index file and management information stored in the memory, and also updates the index file and management information stored in the optical disk 2 based on the updated management information.

In the optical disk device 1 for recording video signals and audio signals as a result of imaging in the optical disk 2, a QT movie file is recorded with a format enabling reference from the outside. Namely, in the optical disk device 1, a video file and an audio file are recorded on the optical disk 2 based on video signals and audio signals respectively, and furthermore a resource file for managing the video file and the audio file is recorded in the optical disk 2, and with the operations as described above, the QT movie file is recorded based on the video file, the audio file, and the resource file in the optical disk 2.

(1-2) Index File

The index file is used for managing information required for reproduction, such as an address of a recording position, a file name, a file length and the like with the file management system in the optical disk 2, like other various types of files, such as the QT movie file recorded in the optical disk 2, and includes information introducing contents of the QT movie file as an object for management recorded in the optical disk 2. Because of the configuration, in the optical disk device 1, by selecting the QT movie file recorded in the optical disk 2 by referring to this index file and reproducing the selected file from the optical disk 2 based on the file management system, even when a number of QT movie files are recorded, it is possible to quickly and accurately select a desired file, which enables an improvement in the operability.

In the index file according to this embodiment, an abstract information for a QT movie file or the like (described as abstract information hereinafter) is assigned to the information introducing contents of the QT movie file recorded in the optical disk 2, and the index file is formed with successive entries of the abstract information blocks, so that each QT movie file can be checked and identified easily and accurately.

In the index file, data groups each including the abstract information are classified according to the attribute, so that the index file has the same file structure as the QT movie file recorded in the optical disk 2. Because of the feature, the index file can be prepared and processed by utilizing a structure of the optical disk device 1 for preparing a QT movie file, which also contributes to the simplification of a structure of the optical disk device 1.

Figure 2:
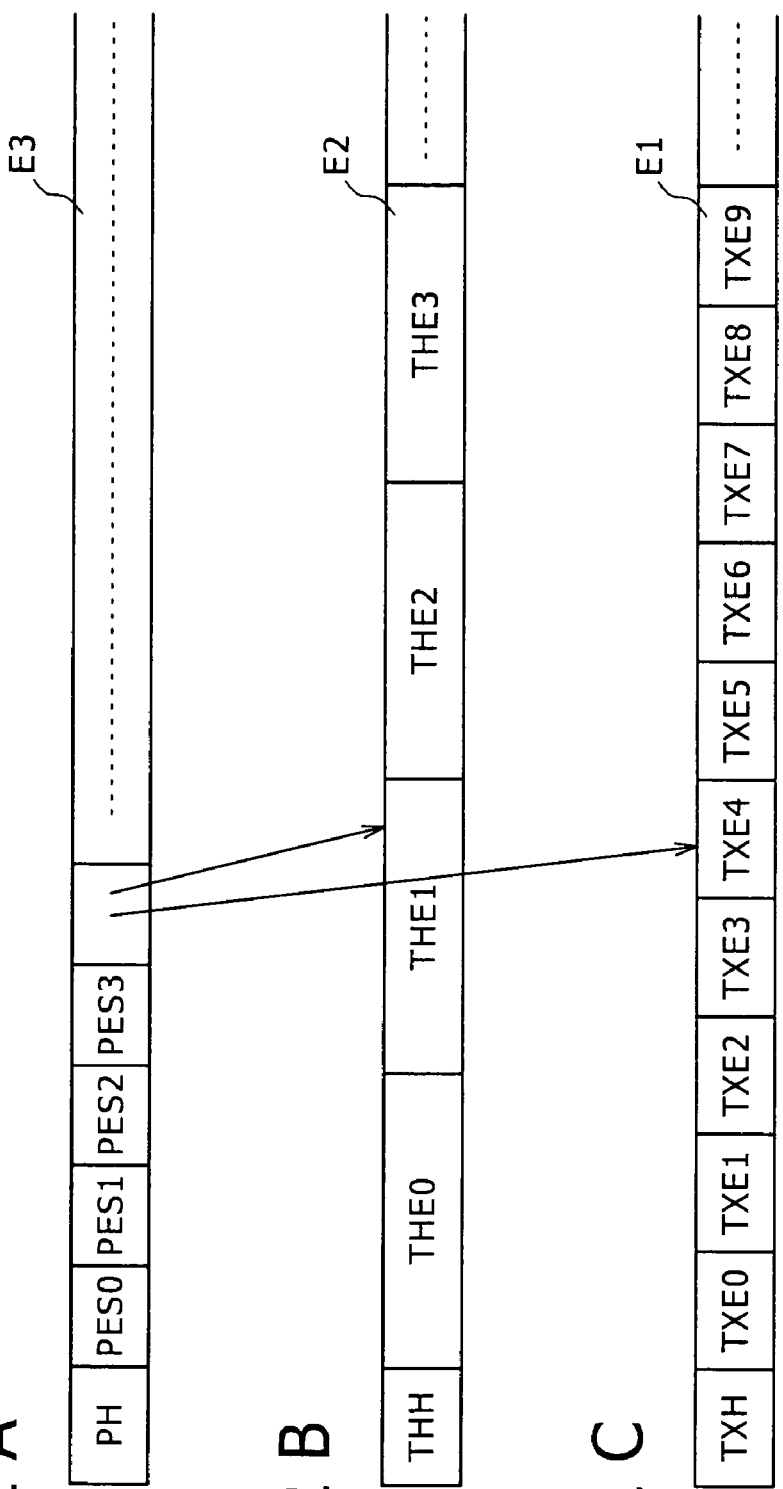
FIGS. 2A to 2C are diagrams indicating the index file.

More specifically, in the index file, abstract information for real data is grouped and assigned, according to the structure of the QT movie file, to a text entry file E1, a thumbnail image entry file E2, and a property entry file E3 as shown in FIG. 2, and therefore the index file is formed with the entry files E1 to E3 and a resource file (not shown) including management information for the entry files E1 to E3.

In this resource file, management information such as that for a start position of a slot in each entry file and the like is recoded together with attribute information for this index file.

In contrast, headers TXH, THH, and PH indicating attributes and the like of the entries E1 to E3 are provided at heeder sections of the entry files E1 to E3 respectively, followed by entries each with a fixed length slot.

In the text entry file E1, data of character strings for disk titles and other tiles relating to management object files and the like are assigned to slots successively, so that the text entry file E1 is formed with a succession of entries including data for the titles. In contrast, in the thumbnail image entry file E2, disk titles and thumbnail images indicating contents of management object files are assigned to slots successively, so that the thumbnail image entry file E2 is formed with a succession of the entries of the thumbnail images.

In the text entry file E1 and the thumbnail image entry file E2, each slot has a fixed length, and one slot or a plurality of slots is allocated to one management object file according to the data volume of the abstract information obtained from the management object file. The type of abstract information varies according to the type of a management object file, so that sometimes an entry may not be provided for a management object file.

In contrast, data of disk titles and attributes of management object files are allocated to the property entry file E3, and abstract information based on binary data set in the disk titles and management object files are successively allocated to slots together with the entry management information, so that the property entry file E3 is formed with a succession of entries based on the abstract information. In the property entry file E3, each slot has a fixed length like in the text entry file E1 as well as in the thumbnail image entry file E2. The property entry file E3 is always provided regardless of the type of the management object file, and furthermore entries for management object files are set in correspondence to entries provided in the text entry file E1 and thumbnail image entry file E2.

When no entry is provided in the text entry file E1 or in the thumbnail image entry file E2, abstract information for one management object file is allocated to one or a plurality of slots according to the data volume of corresponding abstract information in the property entry file E3. On the other hand, when a plurality of entries are set to one management object file in the text entry file E1 or in the thumbnail image entry file E2, entries are provided for the management object files regardless of the data volume of abstract information in the property entry file E3. By configuring a real data portion with a fixed length in the index file, unnecessary consumption of a memory space in a recording medium can be prevented, and times of access to the recording medium can be reduced, so that the time required for processing can be shortened.

(1-3) Management with the Property Entry File

In each entry of the property entry file E3, management information (indicating the relationship as indicated by the arrow heads in FIG. 2) is set, which identifies corresponding other entries as management information entries relating to other entries, and when an entry has a plurality of slots, management information relating to extended slots identifying the following successive entries is set therein. Thus in the index file, a plurality of slots with abstract information for one management object file recorded therein are identified with management information indicating the relationship with other entries set in the property entry file E3. Furthermore, in the property entry file E3, information for identifying corresponding management object files is set, so that the management object files can be identified with the abstract information recorded in this index file.

Furthermore, validity/invalidity information indicating whether abstract information registered in each entry is valid or invalid is set in the property entry file E3. Therefore, in the index file, only by setting the validity/invalidity information provided in the property entry to a necessary value, it is possible to invalidate entries corresponding not only to the property entry file E3, but also to the text entry file E1 and thumbnail image entry file E2 to delete registration of management object files in the index file.

An index file can be registered in each entry file not only for a file actually present on a recording medium, but also for an actual folder and a virtual folder in a file management system on a recording medium, and a layered structure can be defined for property entries with the folder as described above registered therein in each property entry. Because of the feature, the index file can manage files recorded in the optical disk 2 according to the folder structure based on the layered structure actually set in the optical disk 2 and furthermore, according to the folder structure based on the virtual layered structure set in the index file.

Figure 3:
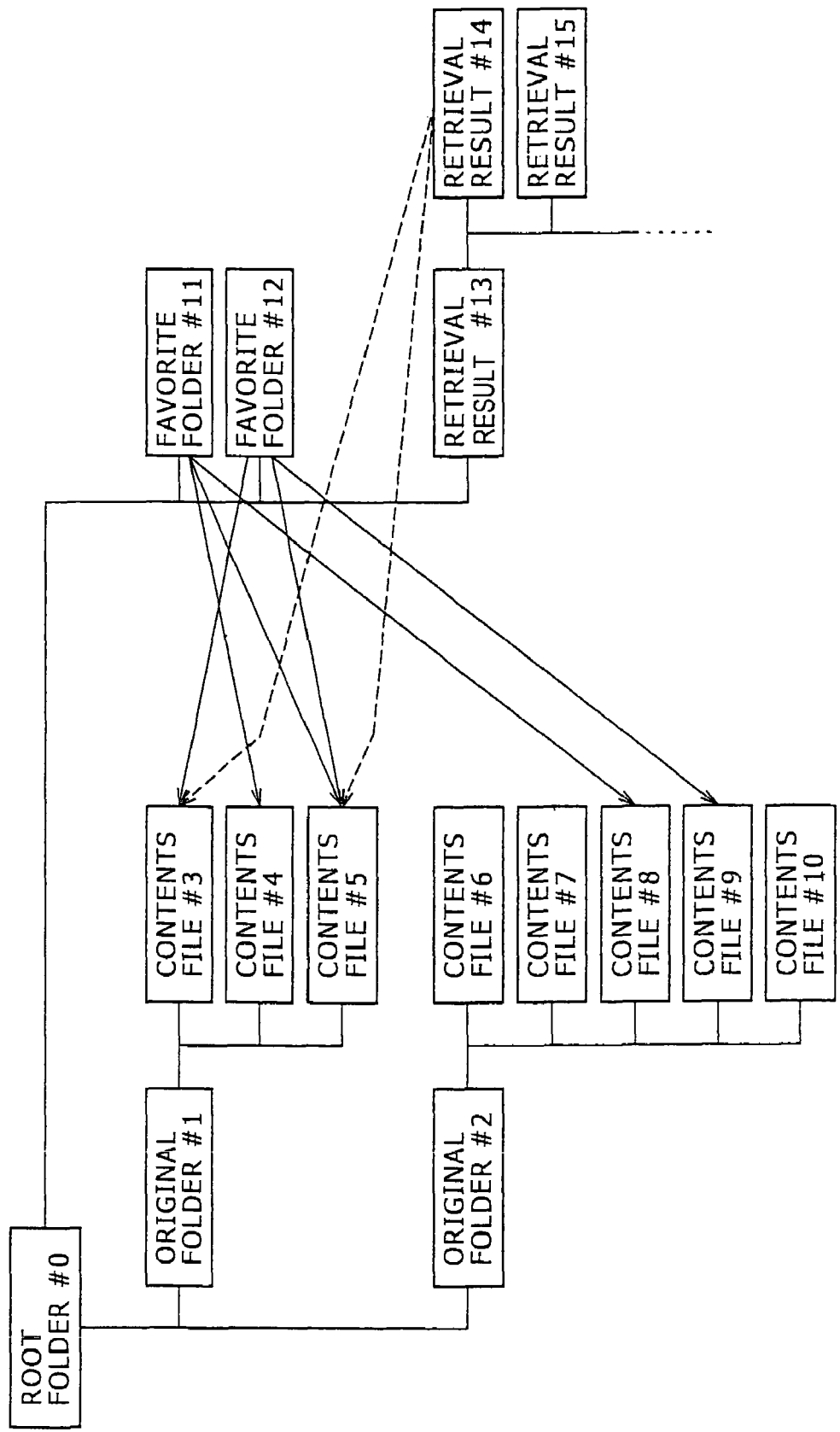
FIG. 3 is a diagram explaining the index file on FIG. 2.

As shown in FIG. 3, when a first original folder and a second original folder are formed under a root folder in a recording medium, an entry #0 for the root folder, an entry #1 for the first original folder, and an entry #2 for the second original folder corresponding to the root folder and first and second original folders respectively are registered in the property entry file E3. Further management information defining layered structures of the folders (referred to as layer information hereinafter) are recorded in the entries #0 to #2 respectively.

When first to third contents files are recorded under the first original folder and fourth to eighth folders are recorded under the second original folder, entries #3 to #10 corresponding to the contents files are registered, and layer information defining the layered structure of the original folders and contents files are recorded in the entries #3 to #10 for the content files as well as the entries #1 and #2 for the first and second original folders to which the contents files belong.

In this embodiment, based on the configuration as described above, the system control microcomputer 19 prepares a folder instructed by a user, records a file relating to a result of imaging to the folder instructed by the user, and also registers entries corresponding to the folder and file in the index file.

In this embodiment, first and second favorite folders are virtually defined under the root folder in relation to entries in the index file having the original layered structure as described above. For the virtual definition, entries #11 and #12 corresponding to the first and second favorite folders respectively are registered in the property entry file E3. The entries #11 and #12 relate to virtual folders respectively, which are defined by setting a flag in the property entry. Further layer information defining a layered structure between the root folder and the first and second favorite folders is set in the entries #11 and #12 for the first and second favorite folders as well as in the entry #0 for the upper folder.

Furthermore, management information (referred to as registration information hereinafter) pointing to the entries #3 to #5, #8, and #9 for files is registered by a user in the first and second favorite folders respectively as shown by the arrow heads in FIG. 3 in response to an operation by the user. In the example shown in FIG. 3, the second, third, and sixth contents files are registered in the first favorite folder, and the first, third, and seventh contents files are registered in the second favorite folder.

When a user instructs registration in a favorite folder by selecting any file by checking displays based on thumbnail images or displays of titles, the system control microcomputer 19 registers the entry of the favorite folder in the property entry file E3 according to the necessity, or sets the registration information pointing to an entry of the file instructed by the user in this entry. With this configuration, in the optical disk device 1, user's file operation can further be simplified based on the virtual folder structure.

More specifically, in this embodiment, identifying information for identifying each entry is allocated to each of the entry files E1 to E3, and furthermore this identifying information is allocated to the layer information and registration information in the property entry file E3. Therefore, in this embodiment, entry numbers are allocated to slots from a header one in the incrementing mode in each entry file. Because of this configuration, in FIG. 3, the entry numbers each set as #4, #5, and #8 for respective corresponding contents files, are registered as registration information pointing other entries respectively in the entry relating to the first favorite folder.

Furthermore, in this embodiment, a folder for a result of retrieval for collecting a result of retrieval is formed under the root folder with a virtual folder like the favorite folder described above. Because of this configuration, an entry #13 for a folder collecting a result of retrieval is registered in this property entry file E3 like in the favorite folder, a title indicating a result of retrieval is registered in the text entry file E1 relating to this entry, and furthermore layer information defining a layered structure between the root folder and the folder for a result of retrieval is set in the entry #13 for the folder for a result of retrieval as well as in the entry #0 for an upper folder.

In this embodiment, a folder collecting a result of retrieval is virtually provided on the index file, and a result of retrieval can be recorded in this folder.

In the index file, entries #14 and #15 for a virtual folder for storing therein a discrete result of retrieval specified by a user are provided under this folder for a result of retrieval. Therefore a result of retrieval is recorded and stored in each of the entries #14 and #15 for this folder, so that a result of retrieval performed in the past can be used effectively at a later date.

It is defined by a flag set in the property entry that the entries #14 and #15 relate to a result of retrieval, and the entry number #13 is registered in the layer information pointing to the entry #13 for an upper folder collecting a result of retrieval. Also, in the entry #13 for an upper folder collecting a result of retrieval, entry numbers of #14 and #15 are registered in the layer information pointing to the lower layer entries #14 and #15. As described above, in this embodiment, also the result of other retrieval can be provided to a user because of the layered structure including a connection to other files, which improves the convenience for users. The layered structure defined as described above can be grasped quickly both from the upper layer side and from the lower layer side.

A file for a result of retrieval is recorded in the entries #14 and #15, each for a result of retrieval like the registration of files belonging to the favorite folder in the entries #11 and #12 in the favorite folder. Namely, for instance, when the first and third contents files are detected in the processing for retrieval in relation to the entry #14 for a result of retrieval, as indicated by an arrow head shown with a broken line, entry numbers for the entries #3 and #5 corresponding to the first and third contents files are set in the registration information. As described above, as in the case of the favorite folder, it is possible to realize the operability as if files each reflecting a result of retrieval are arranged in the folder for a discrete result of retrieval.

In entries in the text entry file E1 corresponding to the entries #14, #15, title names of folders relating to the discrete results of retrieval are registered so that each result of retrieval can be identified, and further retrieval conditions for retrieval are registered therein. In the example shown in FIG. 3, title names are shown as "Retrieval Result 1", "Retrieval Result 2", and the like by adding incrementing numbers to the names of retrieval results. As for the conditions for retrieval, for instance, a keyword used for retrieval is registered.

In the property entry file E3, in addition to the management information as described above, attribute information for management objects, such as a corresponding file, a date of preparation of a folder, a data of updating, a type of a management object file and the like, are allocated, so that a user can search for the management object files recorded in a recording medium according to the attribute information.

(1-4) Retrieval Processing by the System Control Microcomputer 19

Based on the setup for an index file as described above, the system control microcomputer 19 executes processing such as retrieving on the index file in response to an operation by a user.

Figure 4:
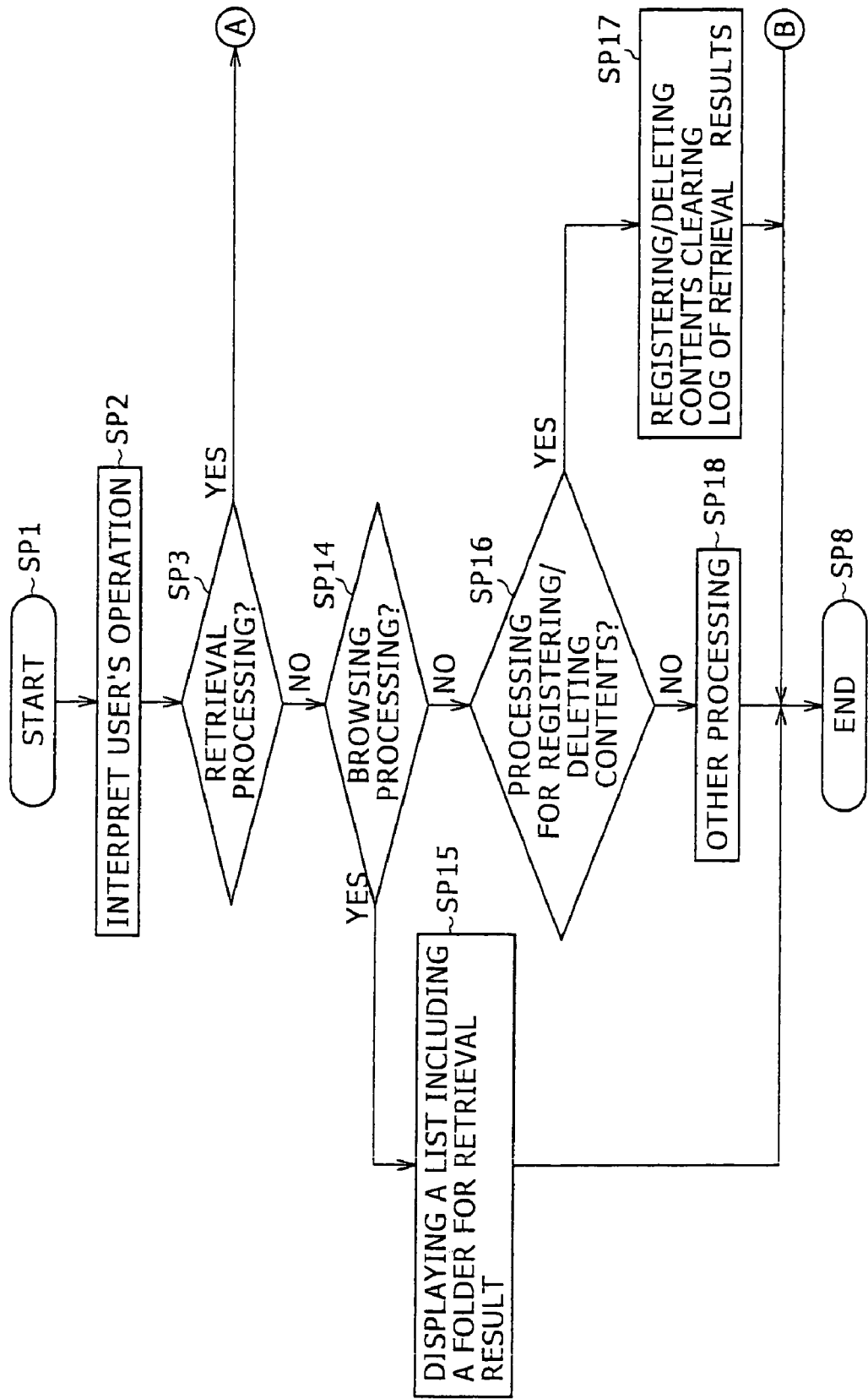
FIG. 4 is a flow chart showing the processing procedure associated with the index file on FIG. 2.
Figure 5:
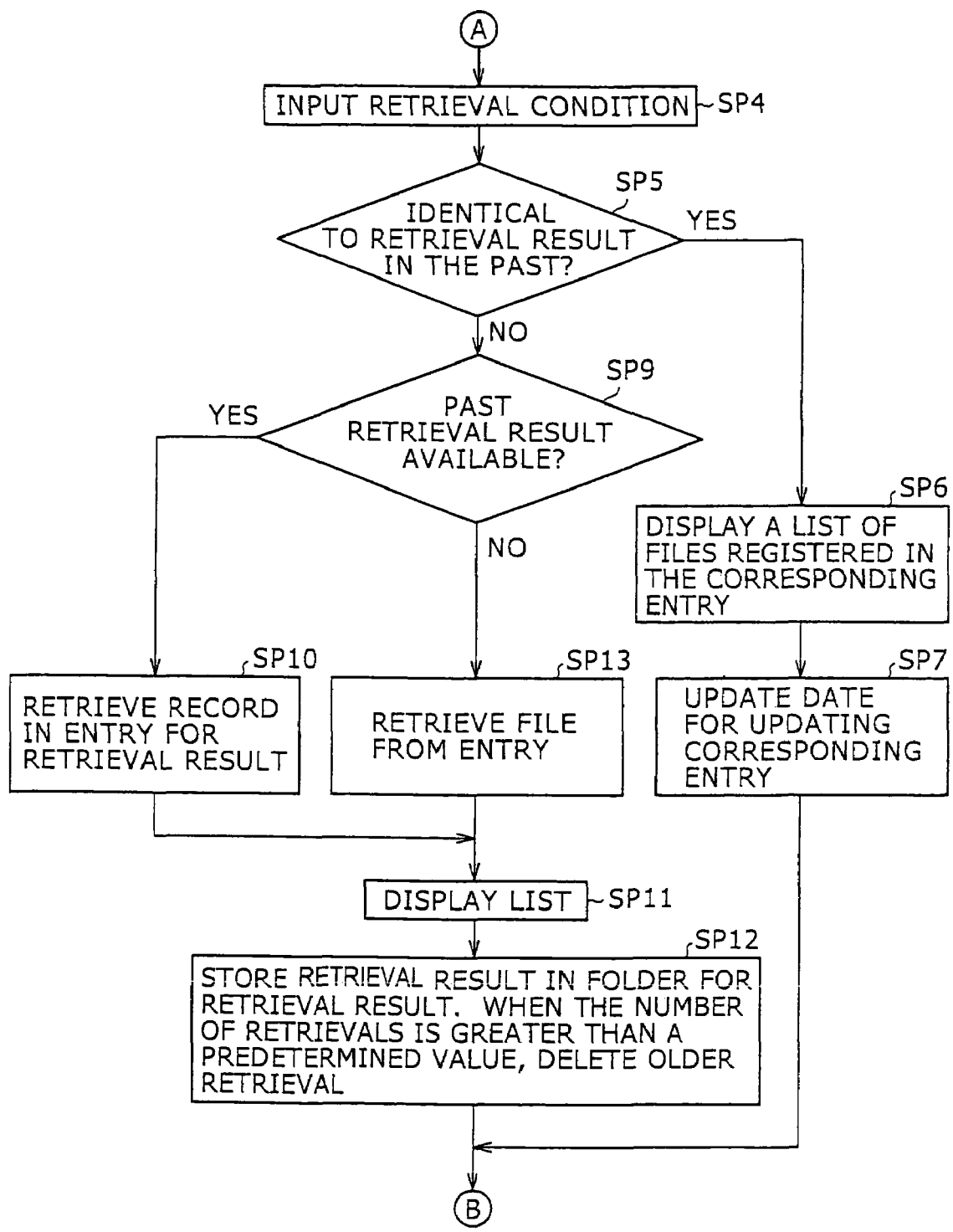
FIG. 5 is a flow chart continued from FIG. 4.

FIG. 4 and FIG. 5 are flowcharts each showing a processing procedure for retrieval performed by the system control microcomputer 19. When an operation on an operating section 26 by a user is detected, the system control microcomputer 19 proceeds from step SP1 to step SP2, and interprets the user's operation. In the following step SP3, the system control microcomputer 19 determines whether or not the user's operation interpreted in step SP2 is a retrieval processing.

When an affirmative result is obtained in step SP3, the system control microcomputer 19 proceeds from step SP3 to step SP4 (Refer to FIG. 5), and has an input screen displayed on a display section to accept conditions for retrieval via the input screen. The conditions for keyword retrieval for titles set in the text entry file E1 include a date of recording, a type of a management object file (whether the file is for a still image or for a moving picture), a result of retrieval in the past, and the like.

When conditions for retrieval are accepted on the input screen, the system control microcomputer 19 proceeds to step SP5, and determines whether or not the conditions for retrieval inputted by a user are identical to any of those already registered in the retrieval result files in the index file.

When an affirmative result is obtained in step SP5, the system control microcomputer 19 proceeds from step SP5 to step SP6, and retrieval result files registered in entries relating to retrieval result folders satisfying the conditions for retrieval are displayed in list form. More specifically, as in the case where tiles registered in a favorite folder are displayed in list form, the system control microcomputer 19 successively detects entries pointed to by the registration information registered in the entries for a retrieval result, and when a display with thumbnail images is specified by a user, it has thumbnail images for the files relating to the retrieval result displayed. When a display with titles is specified by the user, titles of files relating to the retrieval result of text entries relating to the entry are displayed in list form.

When files registered in the index file are retrieved according to the same retrieval conditions as those recorded in the index file, the system control microcomputer 19 presents retrieval results performed in the past according to the retrieval conditions recorded in the index file, so that the user can efficiently perform the retrieval processing by making use of retrieval results in the past.

When a result of retrieval is provided to a user, the system control microcomputer 19 proceeds to step SP7 and updates an updating date for the entry to the current date, and it then proceeds to step SP8 (FIG. 4) to terminate the processing procedure.

When a negative result is obtained in step SP5 (FIG. 5), the system control microcomputer 19 proceeds from step SP5 to step SP9. In step SP9, the system control microcomputer 19 determines whether or not a result of retrieval in the past can be used. More specifically, the system control microcomputer 19 compares the retrieval conditions inputted by the user in step SP4 to the retrieval conditions already registered in the entry for retrieval results in the index file, and when retrieval conditions inputted by the user in step SP4 are further refined as compared to those already registered in the index file, it is determined that the retrieval results in the past can be used. The case where the retrieval results in the past can be used means, for instance, that the retrieval condition registered in the index file requires retrieval of files recorded on a specific date while the retrieval condition inputted in step SP4 by the user requires retrieval of moving picture file recorded on the specific date. Further, also when a user specifies a range for retrieval and the specified range includes a virtual folder relating to a discrete retrieval result, the system control microcomputer 19 determines that the retrieval results in the past can be used.

When it is determined that the retrieval results in the past can be used, the system control microcomputer 19 proceeds from step SP9 to step SP10, and retrieves files satisfying the retrieval conditions set by the user by making use of the retrieval results in the past. More specifically, the system control microcomputer 19 detects registration information set in the entries for discrete retrieval results relating retrieval results in the past, then detects entries pointed to by the registration information, and refines objects for retrieval by making use of the retrieval results in the past. Furthermore, the system control microcomputer 19 determines records in the entries refined according to the retrieval conditions and retrieves files satisfying the retrieval conditions.

The system control microcomputer 19 retrieves files according to the retrieval conditions as described above, and then proceeds from step SP10 to step SP11 to display retrieved files in list format. When displaying the retrieved files, the system control microcomputer 19 displays a list of the retrieved files with thumbnail images or titles of the retrieved files in response to an instruction by a user as described in relation to step SP6 above.

Then the system control microcomputer 19 proceeds to step SP12, and registers entries relating to each retrieval result in the index file so that respective folders for the results of the retrieval processing are prepared under a folder collecting retrieval results. The system control microcomputer 19 further registers succeively entry numbers of the retrieved files in the registration information for this entry, and also records the retrieval conditions in the text entry file. In this processing step, when a range for retrieval is specified by a user and the range of retrieval includes retrieval results in the past recorded in the index file, the system control microcomputer 19 produces a folder for discrete retrieval results under the folder for discrete retrieval results in the past.

Figure 6:
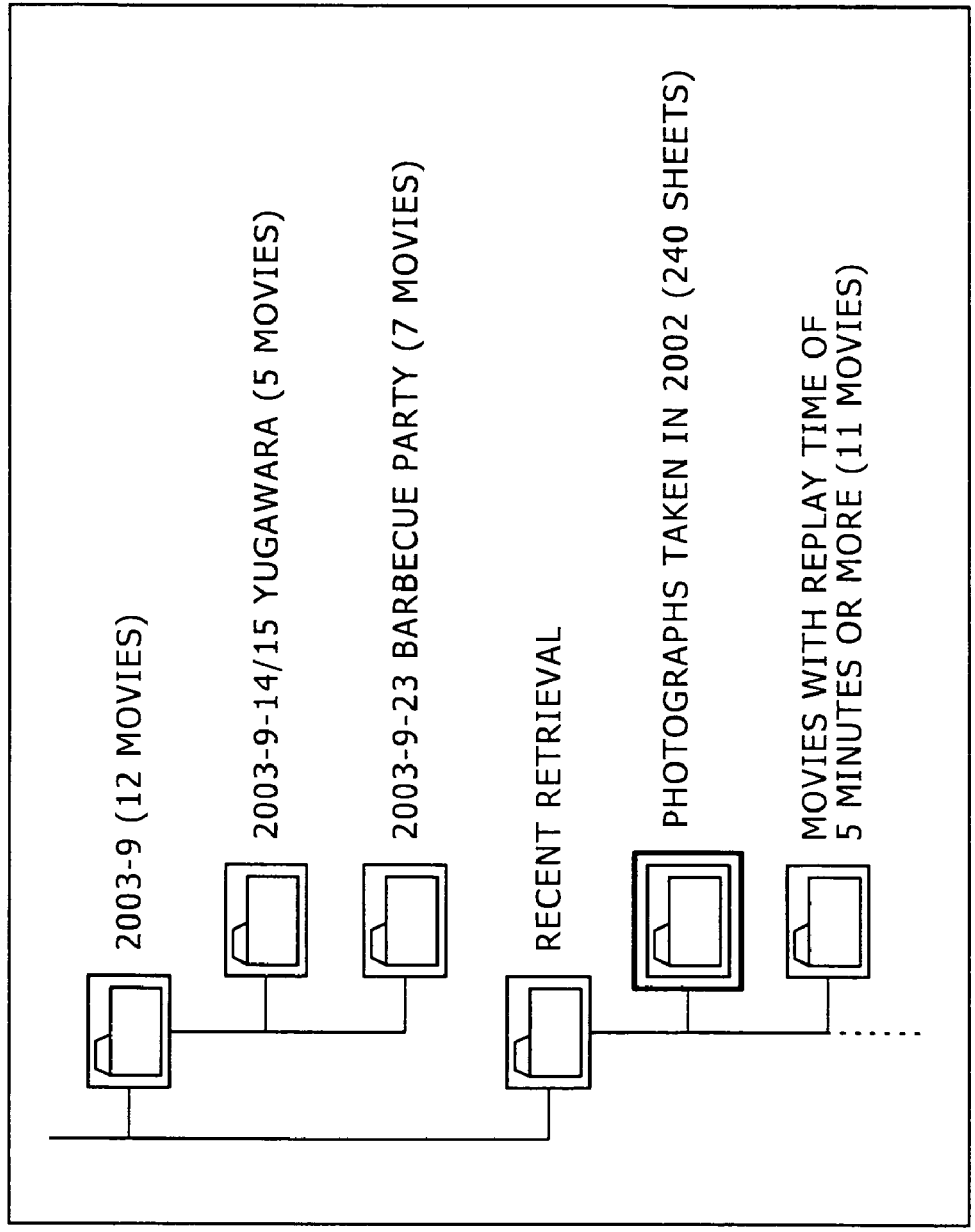
FIG. 6 is a flat view showing an example of the display of the folders associated with the index file.

An upper half portion of the example shown in FIG. 6 illustrates a case in which 12 movies imaged in September, 2003 are retrieved according to the retrieval conditions set based on the date of imaging. A folder for discrete retrieval results relating to the 12 movies are registered in a virtual folder having a folder name of "2003-9" indicating the month and year of imaging; the folder with the title of "2003-9" is retrieved, and then a result of imaging on September 14, 15 and a result of imagery on September 23 are retrieved. A lower portion of the example shown in FIG. 6 illustrates a case in which a folder for a retrieval result with a title of "retrieval performed last" is prepared by last retrieval with a specified date, and retrievals are performed by setting the folder with the title of "retrieval performed last" as a range for retrieval according to the retrieval condition of both the year of imaging and the still image and another condition of the moving picture with five minutes or more of replay time, respectively.

With the configuration as described above, in this optical disk device 1, it is possible to refine a range of retrieval by effectively utilizing retrieval results in the past, which enables a reduction of the time required for processing.

When the system control microcomputer 19 registers folders for discrete retrieval results, if the number of folders for discrete retrieval results is larger than a predetermined number previously set, the system control microcomputer 19 deletes the folder with the oldest update date based on the record of the updating date set in the folders for retrieval results and records a folder for a new retrieval result on behalf of the deleted folder. In this embodiment, no unnecessary records as the results of retrieval are stored which prevents an increase of the data volume in the index file, and which enables the effective utilization of a memory space in a recording medium. When a folder for a result of retrieval is recorded, the system control microcomputer 19 accepts a folder name specified by a user.

When a result of retrieval is registered in the index file in step SP12, the system control microcomputer 19 proceeds to step SP8 to terminate the processing procedure.

In contrast, when retrieval results in the past cannot be used, if a negative result is obtained in step SP9, the system control microcomputer 19 proceeds from step SP9 to step SP13. In step SP13, the system control microcomputer 19 successively determines records of entries in the index file according to the retrieval conditions set by the user, and detects files satisfying the retrieval conditions from records of entries in the index file. When a determination of all entries is finished, the system control microcomputer 19 proceeds to step SP11 and has the retrieval result displayed in list form, then proceeds to step SP12 to record the retrieval result, and then proceeds to step SP8 to terminate the processing procedure.

With the processing steps described above, a user of the optical disk device 1 can execute the processing for retrieval on the index file to quickly and easily detect desired files. Furthermore, the retrieval processing can be performed more easily by using retrieval results in the past for retrieval processing on the index file.

When a user specifies an operation other than retrieval, in the case where a negative result is obtained in step SP3, the system control microcomputer 19 proceeds from step SP3 to step SP14. In step SP14, the system control microcomputer 19 determines whether or not the user specifies processing for browsing, and when an affirmative result is obtained, the system control microcomputer 19 proceeds from step SP14 to step SP15 to have files recorded in the optical disk 2 displayed in list form. In this displaying step, the system control microcomputer 19 has folders recorded in the optical disk 2 displayed based on the layered structure registered on the index file, and has files allocated to this folder displayed with thumbnail images or titles according to a user's instruction relating to the folder. The system control microcomputer 19 further has favorite folders and folders of the retrieval result displayed, and, based on the selection by the user, the system control microcomputer 19 has flies allocated to each folder displayed with thumbnail images or titles. In the example shown in FIG. 6, a focus is set on the folder for a result of retrieval performed according the condition of "pictures taken in 2002" as a folder name, and when a user operates, for instance, an operator for a decision or the like, the files on the folder are displayed.

When the folder or the like is displayed as described above, the system control microcomputer 19 proceeds to step SP8 and terminates the processing procedure.

When a negative result is obtained in step SP14, the system control microcomputer 19 proceeds from step SP14 to step SP16 to determine whether or not the user operation specifies registration of contents as a result of imaging or deletion of contents as a result of imaging, and when an affirmative result is obtained, the system control microcomputer 19 proceeds from step SP16 to step SP17 to register files relating to a result of the imaging in the index file in response to an instruction for recording a result of imaging or to delete the corresponding entries registered in the index file in response to an instruction for deletion of a result of imaging, and then proceeds to step SP8 to terminate this processing procedure.

When a negative result is obtained in step SP16, the system control microcomputer 19 proceeds from step SP16 to step SP18 and terminates the processing responding to the user's operation, and then the system control microcomputer 19 proceeds to step SP8 to terminate the processing procedure.

(2) Operations in the Embodiment

With the configuration as described above, in the optical device 1 (Refer to FIG. 1), video data and audio data acquired with imaging means and voice and sound acquiring means are encoded by the video encoder 11 and the audio encoder 12 and then are converted to a data stream of an QT movie file by the file creator 15 and recorded via a recording system including the memory controller 18, the error correction encoder/decoder 21, the data modulator/demodulator 23, the magnetic field modulation driver 24, and the optical pick-up 33 in the optical disk 2. With the functional configuration described above, in the optical device 1, a result of imaging is recorded as a QT movie file in the optical disk 2. Also output data from the system control microcomputer 19 are outputted to a recording system in the optical disk device 1 in correspondence to recording the files in this optical disk 2, and because of the operations, management information for the file management system of the optical disk 2 is updated in correspondence to the record of the QT movie file.

The QT movie file recorded as described above is sequentially reproduced, based on the management information in the file management system, via the optical pick-up 33, the data modulator/demodulator 23, the error correction encoder/decoder 21, and the memory controller 18 and is decoded to elemental streams of video data and audio data by the file decoder 16 and further decoded and outputted by the video decoder 13 and the audio decoder 14, respectively.

With the optical disk 1, when the QT movie file as described above is recorded, the system control microcomputer 19 acquires data for thumbnail images with the file creator 15, and further acquires title data, for instance, in response to an input by a user before or after the file is recorded. In addition, information such as a file name relating to the file management system is acquired, and also abstract information of the QT movie file to be recorded in the optical disk 2 is acquired by the system control microcomputer 19. In the optical disk 1, like the management information relating to the optical disk 2, an index file is prepared with the abstract information as described above in a memory incorporated in the system control microcomputer 19, and the index file is recorded like the QT file in the optical disk 2. Furthermore, the management information for the file management system is updated to respond to a record of the index file.

In the processing for producing an index file in the system control microcomputer 19, abstract information is classified according to the attributes, and a thumbnail image entry file and a test entry file (shown in FIG. 3) are formed in correspondence to a record of a QT movie file. Furthermore, information indicating an attribute of each entry, information indicating a relation between the entries, and the like are set in a property entry file. In addition, in response to the processing of files recorded in the optical disk 2, for instance, information indicating the relation between the entries is updated, and with the operations as described above, the index file is formed on a memory and recorded in the optical disk 2.

Because of the features described above, in the optical disk device 1, the index file provided improves the operability for users in various types of files recorded in the optical disk 2. Namely, files recorded in the optical file 2 are displayed with titles recorded in the index file or thumbnail images, and a file corresponding to a user's selection from the displayed files is reproduced, and because of the configuration, the user can quickly and accurately select a desired file, which ensures the improved operability for the user.

Furthermore, a folder for the index file is set, and the folder is defined with the layered structure, so that a number of files recorded in the optical disk 2 can be provided to a user with the layered structure of the original file, which also ensures the improved operability for users.

When setting the folder according to the folder having the layered structure as described above, also a favorite folder which is a virtual folder can be registered in the index file, and therefore a desired file can be selected also with the virtual layered structure based on the folder as described above without giving any change to the original layered structure, which also ensures the improved operability for users.

The index file prepared as described above includes abstract information for a management object file, and for instance, the processing for retrieval according to a date of imaging can be executed on the index file, and by the feature, as compared with a case in which a file recorded in the optical disk 2 is retrieved by referring to the file management system, a desired result of retrieval can be acquired substantially more quickly and accurately.

When a number of files are recorded in the optical disk 2, sometimes the retrieval processing is repeated for retrieving files, for instance, relating to a specific event such as an athletic meeting or a travel, and in the situation as described above, the retrieval processing can be simplified without repeating retrieval processing if the result of retrieval in the past is effectively utilized. In the embodiment as described above, a folder for summing up the results of retrieval is formed with a virtual folder (FIG. 3), and when a retrieval is instructed by a user, the retrieval result can be obtained by checking the entries registered in the index file and furthermore folders for recording therein a discrete retrieval result are formed under the folder for summing up the results of retrieval, and registration information pointing to entries of files as the results of retrieval are set together with the retrieval conditions in this folder.

In the embodiment, results of retrieval in the past can be used later by recording a folder for the retrieval results, which simplifies the processing for retrieving files and ensures the improved user interface.

When recording the retrieval results as described above, the files are registered in the favorite folder, and also registration information based on entry numbers of the files is registered. Furthermore, the layered structure is defined by setting the same layer information as that for the favorite folder, and because of the layered structure, in various equipment having an application program capable of processing the index file, data for retrieval results registered as described above can effectively be utilized, which ensures improved versatility.

When recording the retrieval result as described above, it can also be considered to record and store the retrieval result in file form in the optical disk 2, but in this case, an application program for files as retrieval results is required, which substantially degrades the versatility. Also, it is conceivable to record and store the retrieval results in the device, but when data in the optical disk 2 is reproduced with another device, the retrieval results in the past can not be used effectively.

In contrast, in this embodiment, excellent versatility is ensured, and retrieval results in the past can be utilized effectively later.

In the embodiment, when retrieval according to the same retrieval conditions as those employed in retrieval in the past is specified, the retrieval results recorded in the folder are provided to the user without retrieving entries in the index file, so that the user is not required to check each entry in the index file, which ensures the substantially improved convenience in use for users.

When retrieval is performed based on further refined retrieval conditions as compared with those employed in retrieval in the past, records of entries are determined successively according to the retrieval conditions by referring to the entry for files registered in the folder for retrieval results in the past, so that retrieval is executed based on the further refined retrieval conditions, and therefore the retrieval processing can be executed easily and quickly.

(3) Effects of the Embodiment

With the configuration as described above, it is possible to effectively utilize retrieval results in the past by recording and storing retrieval result in an entry for a virtual folder at a later date.

Furthermore, by executing retrieval by refining a range for retrieval from a range for retrieval in the past, the retrieval processing can be simplified substantially.

(4) Other Embodiments

In the embodiment described above, the present invention is applied to the retrieval of files, but the present invention is not limited to the configuration, and it can be applied to retrieval of folders or to retrieval conditions in the past. In this case, entries for the folders are retrieved on the index file and registered in a folder for retrieval results instead of retrieval of entries for files and registration of the retrieval results for filing on the index file described above.

In the embodiment described above, a data group based on abstract information and a management data group for managing the data group are stored in the integrated state with the QT file structure allowing external reference thereto and are described. The present invention, however, is not limited to the configuration, and various formats are applicable in the present invention according to necessity.

In the embodiment described above, the present invention is applied to an optical disk device, and a result of imaging, an output from a personal computer and the like are recorded in the optical disk device; but the present invention is not limited to this configuration, and the present invention can also be applied to the management of a number of files recorded in various types of recording media, including a magneto-optical disk, a hard disk device, and the like, and also to management of a number of files stored in a prespecified server.

In the embodiment described above, management object files are managed with a QT movie file, but the present invention is not limited to this configuration, and it also is applicable to management of files of video data with various formats and files of audio data.

INDUSTRIAL APPLICABILITY

The present invention relates to a file managing device, a file managing method, a program for the file managing method, and a recording medium with the program for the file managing method recorded therein, and is applicable, for instance, to an optical disk device.

The invention claimed is:

1. A file management device for managing files recorded in a recording medium with an index file recorded in the recording medium, wherein the index file is made up of entries for extracted text which is extracted from files recorded in the recording medium, entries for thumbnail images extracted from the files recorded in the recording medium, entries for property information including hierarchy management information which expresses a hierarchical structure of the files and a folder recorded on the recording medium, registration information which indicates files belonging to the folder by pointing to entries, and virtual folder information that indicates whether or not the folder is a virtual folder;

wherein the file management device retrieves the entries of the index file according to conditions for retrieval set by a user to select a file registered in the index file, and registers, as an entry for the virtual folder, a retrieval result as to retrieved file along with the conditions for retrieval, in the index file; and wherein, when the entry for the retrieval result is registered, information indicating that the entry is for the retrieval result is set in the index file, wherein the hierarchy management information is set so as to indicate that the virtual folder for the retrieval result is under a virtual retrieval result collection folder in which retrieval results are collected, and the registration information is set to point to an entry of the retrieved file.

2. A file managing method of managing files recorded in a recording medium with an index file recorded in the recording medium, wherein the index file is made up of entries for extracted text which is extracted from files recorded in the recording medium, entries for property information including hierarchy management information which expresses a hierarchical structure of the files and a folder recorded on the recording medium, registration information which indicates files belonging to the folder by pointing to entries, and virtual folder information that indicates whether or not the folder is a virtual folder; and said method comprising:

a step of retrieving the entries of the index file according to retrieval conditions set by a user to select a file registered in the index file;

a step of registering, as an entry for the virtual folder, a retrieval result about the retrieved file in the index file, along with the conditions for retrieval;

a step of setting information indicating that the entry is for the retrieval result in the index file, and a step of setting the hierarchy management so as to indicate that the virtual folder for the retrieval result is under a virtual retrieval result collection folder in which retrieval results are collected; and a step of setting the registration information to point to an entry of retrieved file.

3. The file managing method according to claim 2, wherein retrieval of the entries of the index file in the retrieving step is performed by refining the conditions for retrieval registered in the entry for the retrieval result.

4. The file management device according to claim 1, wherein retrieval of the entries of the index file in the retrieving step is performed by refining the conditions for retrieval registered in the entry for the result of retrieval.

5. The file management device according to claim 1, wherein in a retrieval processing, when the file management device determines that the conditions for retrieval are identical to any of those already registered in the virtual folder, the file management device displays the retrieval result performed in past under the identical conditions for retrieval.

6. The file management device according to claim 1, wherein updating date is registered in the entry for the virtual folder.

7. The file management device according to claim 6 wherein the file management device determines that the number of entries for retrieval results is larger than a predetermined number, the file management device deletes an entry with the oldest update date.

* * * * *